S. ELLIOTT.
Corn Sheller.

No. 13,640.

Patented Oct. 9, 1855.

UNITED STATES PATENT OFFICE.

STEPHEN ELLIOTT, OF WAYNE COUNTY, INDIANA.

CORN-SHELLER.

Specification of Letters Patent No. 13,640, dated October 9, 1855.

*To all whom it may concern:*

Be it known that I, STEPHEN ELLIOTT, of Wayne county, in the State of Indiana, have invented certain new and useful Improvements in Corn-Shellers; and I do hereby declare that the following is a full and exact description thereof, reference being had to the accompanying drawings and to the letters of reference marked thereon.

Figure 2:
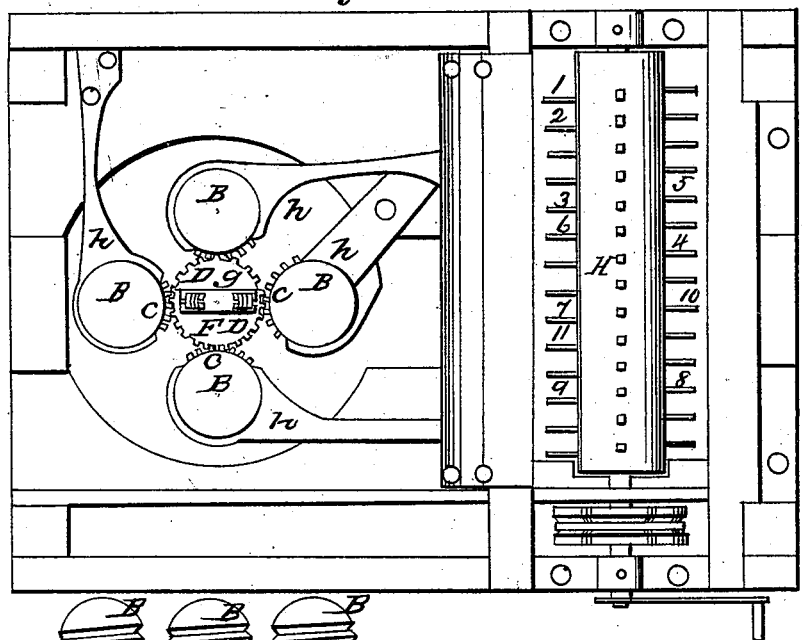
Figure 1:
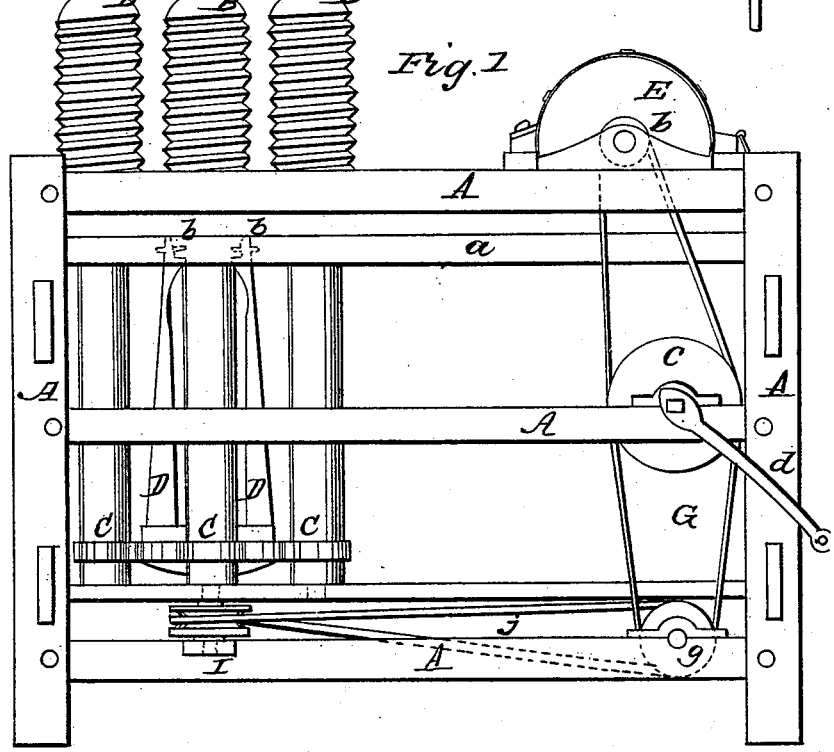

Figure 1, is a side elevation. Fig. 2, is a top view.

In the construction of my machine in Fig. 1—A, A, A, A, A, is the frame, *a* the beams on which the springs for keeping the screws together, rest—B, B, B, the screws for feeding the corn to the sheller. C, C, C, cog wheels on the lower ends of the screws B, B, B. D, D the spring clamp jaws with projections or teeth *b*, *b* on the inside for shelling the corn from the cob. *c* the driving pulley on the end of the main shaft. *d*, the crank for operating it. *g* the pulley wheel on the lower shaft. G the belt extending from pulley *c* to pulley *g*.

In Fig. 2—B, B, B, B, are the screws. *h*, *h*, *h*, *h*, are the springs for pressing the screws together causing them to suit the different sizes of the ears of corn. C, C, C, C, the cog or gear wheels on the lower end of the screws. F the gear wheel for driving the spring clamp jaws. D, D the spring clamp jaws. Fig. 1 I pulley wheel. *j* belt for driving it.

In operating my machine I revolve the shaft by any known power. The main shaft also connects with the lower shaft by means of belt *g*, connects with gear or driving wheel F, by means of pulley I, and belt *j*, which as it revolves puts in motion the screws B, B, B, B, and spring clamps D, D, and as the corn is put into the hopper it is received in the center of the screws, which in their revolutions carry it down into the jaws of the sheller or spring clamps D D which receive it at the center of motion, and as they revolve the corn is shelled entirely from the cob, and it falls down and passes through the machine. By means of the springs *h*, *h*, *h*, *h*, the screws B, B, B, B, are enabled to accommodate themselves to the size of the ear of corn, the spring clamp sheller also possesses the same adjustability and always fits to the ear in shelling.

I claim—

The combination of the screws B with the clamping jaws D arranged and operating in the manner set forth.

STEPHEN ELLIOTT.

Witnesses:
T. G. CLAYTON,
J. C. CLAYTON.